US012443830B2

(12) United States Patent
Cassidy et al.

(10) Patent No.: US 12,443,830 B2
(45) Date of Patent: Oct. 14, 2025

(54) COMPRESSED WEIGHT DISTRIBUTION IN NETWORKS OF NEURAL PROCESSORS

(71) Applicant: INTERNATIONAL BUSINESS MACHINES CORPORATION, Armonk, NY (US)

(72) Inventors: Andrew S. Cassidy, San Jose, CA (US); Rathinakumar Appuswamy, San Jose, CA (US); John V. Arthur, Mountain View, CA (US); Pallab Datta, San Jose, CA (US); Steve Esser, San Jose, CA (US); Myron D. Flickner, San Jose, CA (US); Dharmendra S. Modha, San Jose, CA (US); Jun Sawada, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

(21) Appl. No.: 16/733,393

(22) Filed: Jan. 3, 2020

(65) Prior Publication Data

US 2021/0209450 A1 Jul. 8, 2021

(51) Int. Cl.
*G06N 3/063* (2023.01)
*G06N 5/04* (2023.01)

(52) U.S. Cl.
CPC ............. *G06N 3/063* (2013.01); *G06N 5/04* (2013.01)

(58) Field of Classification Search
CPC ................................. G06N 3/063; G06N 5/04
See application file for complete search history.

(56) References Cited

U.S. PATENT DOCUMENTS 4,782,486 A * 11/1988 Lipcon ................... G11C 29/28
714/722
11,238,347 B2 2/2022 Taba et al.
(Continued)

FOREIGN PATENT DOCUMENTS

WO WO-2019086104 A1 * 5/2019 ........... G06N 3/0495
WO WO-2019207376 A1 * 10/2019 ........... G06F 9/4843

OTHER PUBLICATIONS

Nandakumar, et. al. "Mixed-precision training of deep neural networks using computational memory", Dec. 4, 2017, ArXiv:1712.0119v1 (Year: 2017).*

(Continued)

*Primary Examiner* — Viker A Lamardo
*Assistant Examiner* — Sally T. Ley
(74) *Attorney, Agent, or Firm* — Zilka-Kotab, P.C.

(57) ABSTRACT

A neural inference chip includes a global weight memory; a neural core; and a network connecting the global weight memory to the at least one neural core. The neural core comprises a local weight memory. The local weight memory comprises a plurality of memory banks. Each of the plurality of memory banks is uniquely addressable by at least one index. The neural inference chip is adapted to store in the global weight memory a compressed weight block comprising at least one compressed weight matrix. The neural inference chip is adapted to transmit the compressed weight block from the global weight memory to the core via the network. The core is adapted to decode the at least one compressed weight matrix into a decoded weight matrix and store the decoded weight matrix in its local weight memory. The at core is adapted to apply the decoded weight matrix to a plurality of input activations to produce a plurality of output activations.

22 Claims, 15 Drawing Sheets

(56) References Cited

U.S. PATENT DOCUMENTS

| | | |
|---|---|---|
| 2016/0217369 A1 | 7/2016 | Annapureddy et al. |
| 2017/0193361 A1 | 7/2017 | Chilimbi et al. |
| 2018/0046895 A1 | 2/2018 | Xie et al. |
| 2018/0046916 A1 | 2/2018 | Dally et al. |
| 2019/0042926 A1* | 2/2019 | Baghsorkhi ............ G06N 3/063 |
| 2019/0180183 A1* | 6/2019 | Diamant .................. G06N 3/06 |
| 2019/0303750 A1* | 10/2019 | Kumar .................. G06F 7/5443 |
| 2019/0325295 A1 | 10/2019 | Modha et al. |
| 2020/0293876 A1* | 9/2020 | Phan .................... H03M 7/702 |

OTHER PUBLICATIONS

Han et al., "EIE: efficient inference engine on compressed deep neural network," Computer Architecture (ISCA), 2016 ACM/IEEE 43rd Annual International Symposium on, pp. 243-254: See highlighted sections (2016).

Duff et al., "Some Design Features of a Sparse Matrix Code," ACM Transactions on Mathematical Software, vol. 5, No. 1, Mar. 1979, 18 pages.

Kepner et al., "Graph Algorithms in the Language of Linear Algebra", Society for Industrial and Applied Mathematics Philadelphia, Chapter 13, 2011, 372 pages.

\* cited by examiner $$\begin{Bmatrix} 3 & 0 & 0 & 0 \\ 1 & 0 & 0 & 0 \\ 0 & 0 & 8 & 0 \\ 0 & 4 & 0 & 0 \\ 0 & 0 & 0 & 5 \\ 0 & 0 & 0 & 0 \\ 0 & 6 & 0 & 0 \\ 0 & 0 & 0 & 2 \end{Bmatrix} \overset{611}{} \Rightarrow \begin{Bmatrix} 0,3 \\ 0,1 \\ 2,8 \\ 1,4 \\ 3,5 \\ -,- \\ 1,6 \\ 3,2 \end{Bmatrix} \overset{612}{}$$

FIG. 6A

$$\begin{Bmatrix} 3 & 12 & 0 & 0 \\ 1 & 0 & 13 & 0 \\ 14 & 0 & 8 & 0 \\ 0 & 4 & 0 & 0 \\ 0 & 0 & 0 & 5 \\ 0 & 15 & 0 & 0 \\ 0 & 6 & 0 & 17 \\ 16 & 0 & 0 & 2 \end{Bmatrix} \overset{621}{} \Rightarrow \begin{Bmatrix} 0,3 & 1,12 \\ 0,1 & 2,13 \\ 0,14 & 2,8 \\ 1,4 & -,- \\ 3,5 & -,- \\ 1,16 & -,- \\ 1,6 & 3,17 \\ 1,15 & 3,2 \end{Bmatrix} \overset{622}{}$$

FIG. 6B

COMPRESSED WEIGHT DISTRIBUTION IN NETWORKS OF NEURAL PROCESSORS

This invention was made with Government support under FA8750-18-C-0015 awarded by U.S. Air Force, Office of Scientific Research. The government has certain rights to this invention.

BACKGROUND

Embodiments of the present disclosure relate to networks of inference processing units, and more particularly to compressed weight distribution in networks of neural processors.

BRIEF SUMMARY

According to embodiments of the present disclosure a neural inference chip is provided, comprising a global weight memory; at least one neural core; and a network connecting the global weight memory to the at least one neural core. The at least one neural core comprises a local weight memory. The local weight memory comprises a plurality of memory banks. Each of the plurality of memory banks is uniquely addressable by at least one index. The neural inference chip is adapted to store in the global weight memory a compressed weight block comprising at least one compressed weight matrix. The neural inference chip is adapted to transmit the compressed weight block from the global weight memory to the at least one neural core via the network. The at least one core is adapted to decode the at least one compressed weight matrix into a decoded weight matrix and store the decoded weight matrix in its local weight memory. The at least one neural core is adapted to apply the decoded weight matrix to a plurality of input activations to produce a plurality of output activations.

According to embodiments of the present disclosure, methods of and computer program products for weight distribution in networks of neural processors are provided. A compressed weight block comprising at least one weight matrix is stored in a global weight memory of a neural inference chip. The compressed weight block is transmitted from the global weight memory to at least one neural core on the neural inference chip via a network. The at least one neural core comprises a local weight memory. The local weight memory comprises a plurality of memory banks. Each of the plurality of memory banks is uniquely addressable by at least one index. The network interconnects each of the plurality of memory banks. The at least one compressed weight matrix is decoded into a decoded weight matrix. The decoded weight matrix is stored in a local weight memory of a neural core. The decoded weight matrix is applied to a plurality of input activations to produce a plurality of output activations.

BRIEF DESCRIPTION OF THE SEVERAL VIEWS OF THE DRAWINGS

FIGS. 6A-B illustrate a first encoding format according to embodiments of the present disclosure.

DETAILED DESCRIPTION

Figure 1:
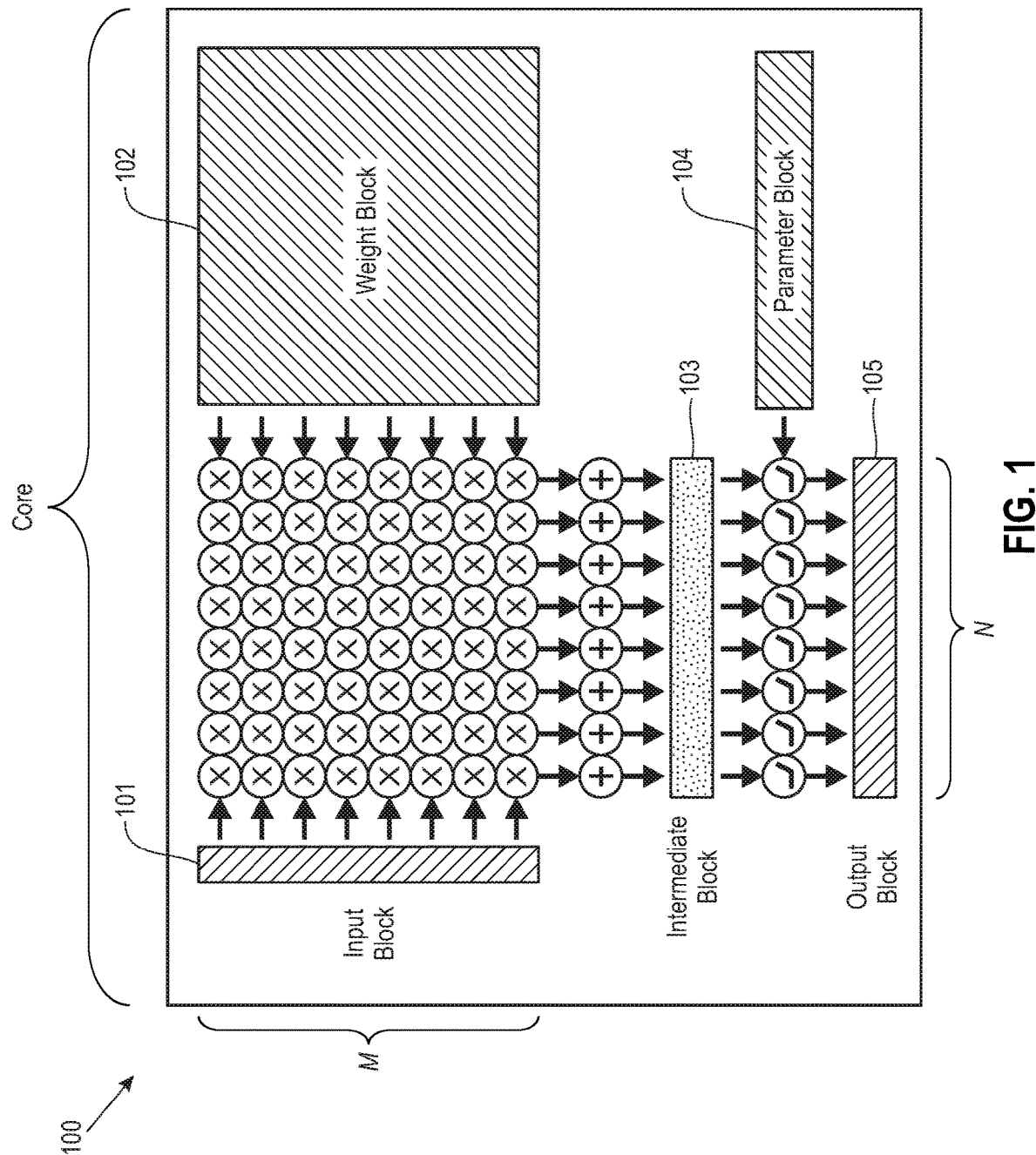
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V[i, j, k,:], and the weighted sum Z[i, j, k] can be computed as in Equation 2.

$$Y[i,j,k]=\sigma(V[i,j,k,:];Z[i,j,k]) \quad \text{Equation 1}$$

$$Z[i, j, k] = \sum_{a=1}^{A}\sum_{b=1}^{B}\sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i, j, k]=σ(Z[i, j, k])=Z[i, j, k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
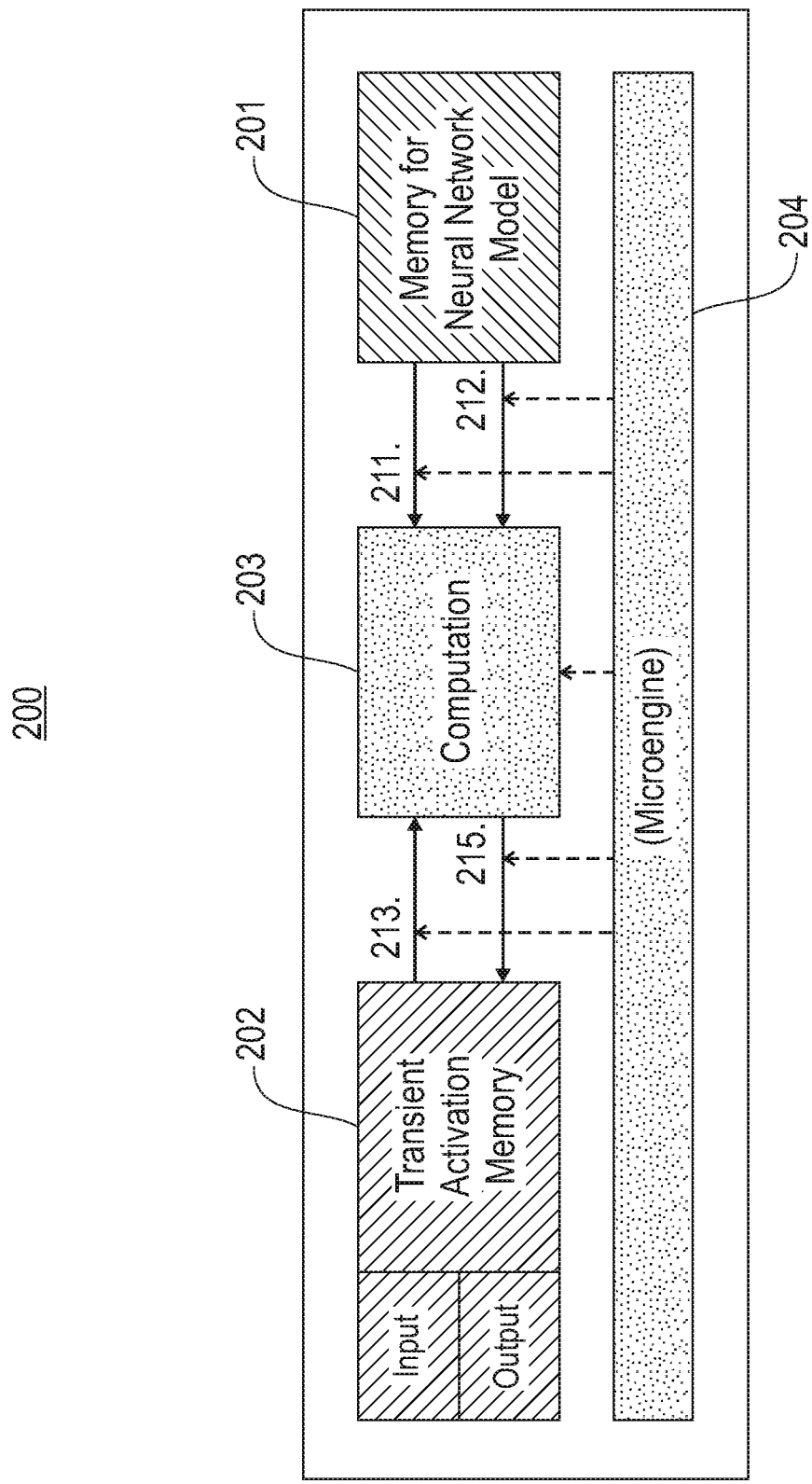
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a microengine 204 is included in IPU 200. In such embodiments, all operations in the IPU are directed by the microengine. As set out below, central and/or distributed microengines may be provided in various embodiments. A global microengine may be referred to as a chip microengine, while a local microengine may be referred to as a core microengine or local controller. In various embodiments a microengine comprises one or more microengines, microcontrollers, state machines, CPUs, or other controllers.

Figure 3:
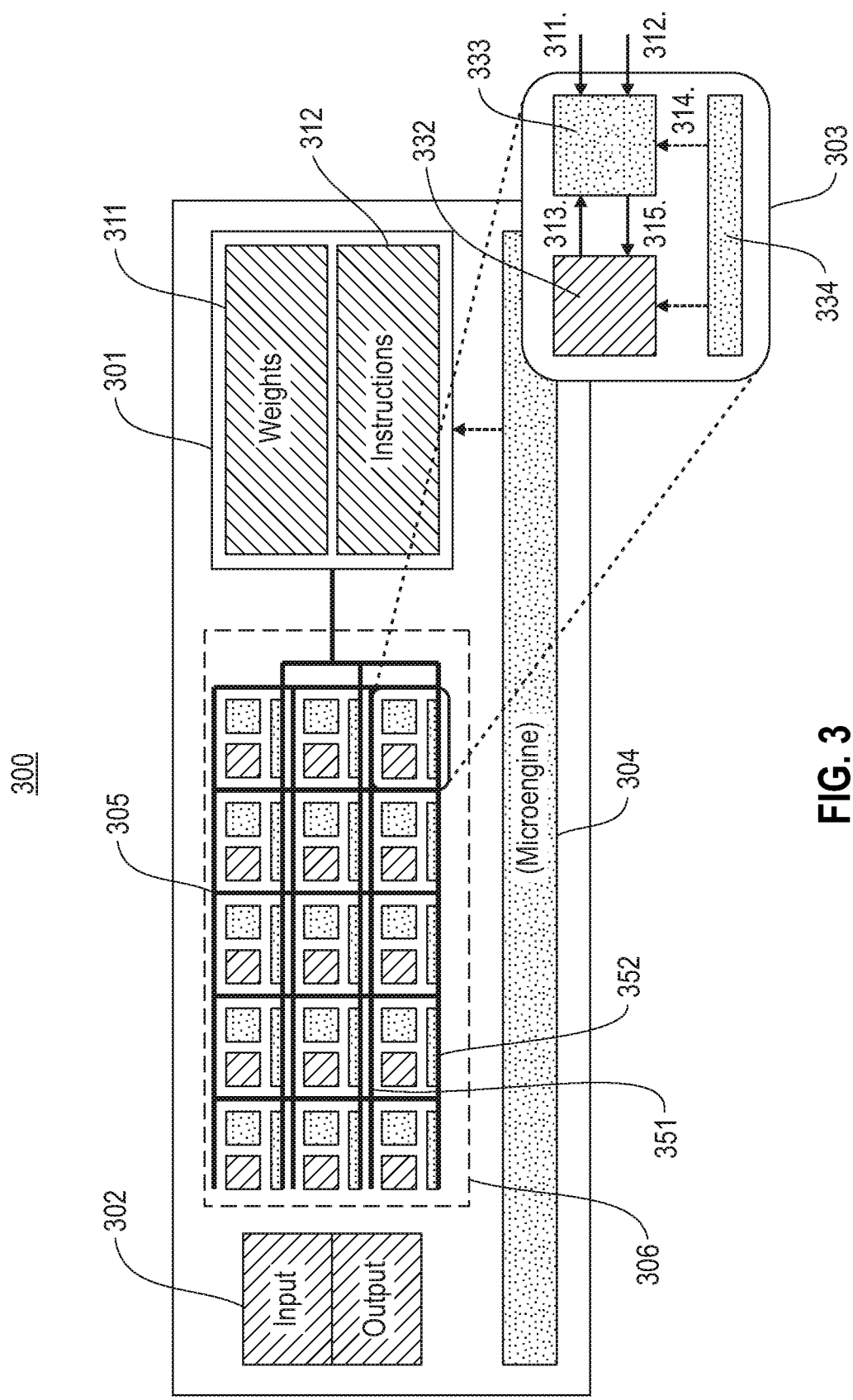
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a memory 301 for the neural network model and instructions. In some embodiments, memory 301 is divided into weigh portion 311 and instruction portion 312. As described above, the neural network model may include the synapse weights for a neural network to be computed. IPU 300 includes an activation memory 302, which may be transient. Activation memory 302 may be divided into input and output regions, and stores neuron activations for processing. IPU 300 includes a plurality of cores 303. Each core 303 includes a neural computation unit 333, which is loaded with a neural network model from model memory 301. Each core also includes a local activation memory 332. Input activations are provided from local activation memory 332 in advance of each computation step. Outputs from neural computation unit 333 are written back to activation memory 332 for processing on the same or another neural computation unit.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 301 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global microengine 304 is included in IPU 300. In various embodiments, a local core controller 334 is included on each core 303. In such embodiments, the direction of operations is shared between the global microengine (chip microengine) and the local core controller (core microengine). In particular, at 311, compute instructions are loaded from model memory 301 to the neural computation unit 333 on each core 303 by global microengine 304. At 312, parameters (e.g., neural network/synaptic weights) are loaded from model memory 301 to the neural computation unit 333 on each core 303 by global microengine 304. At 313, neural network activation data are loaded from activation local activation memory 332 to neural computation unit 333 on each core 303 by local core controller 334. As noted above, the activations are provided to the axons of the particular neural network defined by the model, and may originate from the same or another neural computation unit, or from outside the system. At 314, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 315, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. The results from computation are stored in local activation memory 332 as directed by local core controller 334. These stages may be pipelined, in order to provide efficient usage of the computation unit on each core. It will also be appreciated that inputs and outputs may be transferred from local activation memory 332 to global activation memory 302 according to the requirements of a given neural network.

Accordingly, the present disclosure provides for runtime control of operations in an Inference Processing Unit (IPU). In some embodiments, the microengine is centralized (single microengine). In some embodiments, the IPU computation is distributed (performed by an array of cores). In some embodiments, runtime control of operations is hierarchical—both a central microengine and distributed microengines participate.

The microengine or microengines direct the execution of all operations in the IPU. Each microengine instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

As set out above, there is a limited amount of local weight storage on a given core. Likewise, there is limited weight distribution bandwidth (in exemplary embodiments of an IPU, there are 16 clock cycles allocated per weight block). It will be appreciated that these physical limitations are present on any inference processing unit, and indeed in any processor architecture.

The present disclosure provides systems and methods for overcoming the weight distribution bottleneck. This is particularly useful for executing fully-connected layers or any layer with low weight reuse. In addition, the systems and methods provided herein help reduce the energy consumption for distributing weights.

In various embodiments, sparse weights are compressed for transmission to each core. Zero-valued weights do not need to be stored or transmitted to obtain the desired computational result. In various embodiments, training techniques are applied to make the resulting neural networks weights sparse. For the purposes of this disclosure, a sparse weight matrix is one having more zero entries than non-zero entries.

Figure 4:
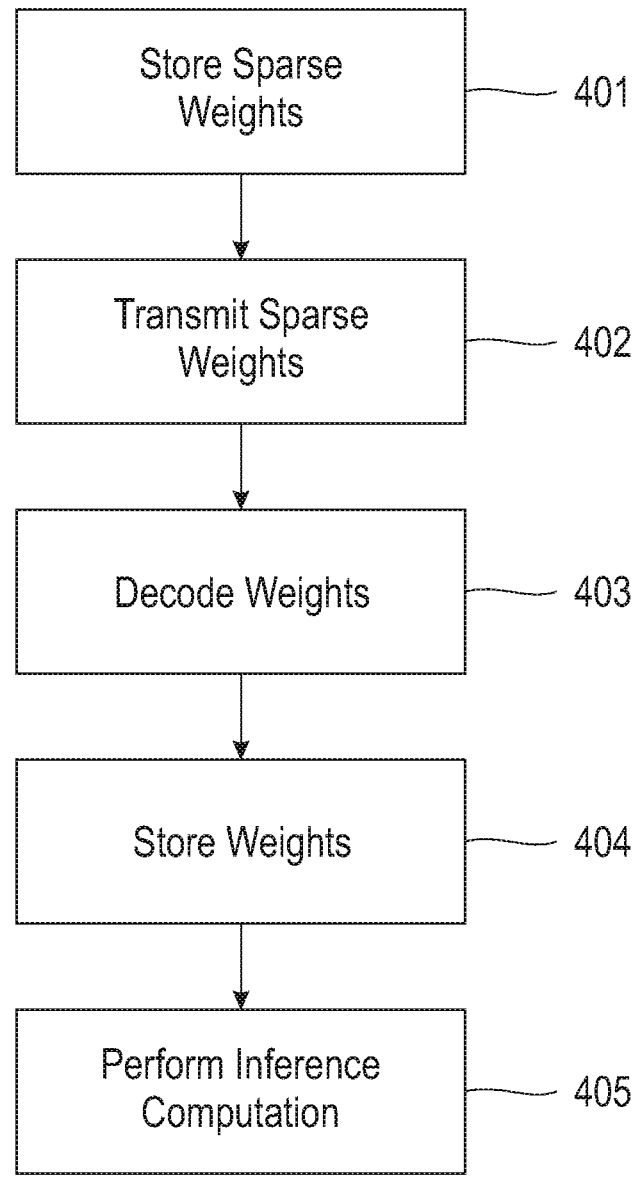
FIG. 4 illustrates a method of compressed weight distribution according to embodiments of the present disclosure.

Referring now to FIG. 4, method of compressed weight distribution according to embodiments of the present disclosure is illustrated. At 401, sparse weights are stored in a compressed format in global memory (e.g., memory 301). At 402, sparse weights are transmitted in the compressed format from global memory to cores (e.g., to cores 303 via network 352). At 403, the compressed sparse weight format is decoded in the cores (e.g., cores 303). At 404, weights are stored in a dense (decompressed) format in core weight memory (e.g., memory). At 405, computation is performed in the core using the dense (decompressed) weight format (e.g., by neural computation unit 333).

Figure 5:
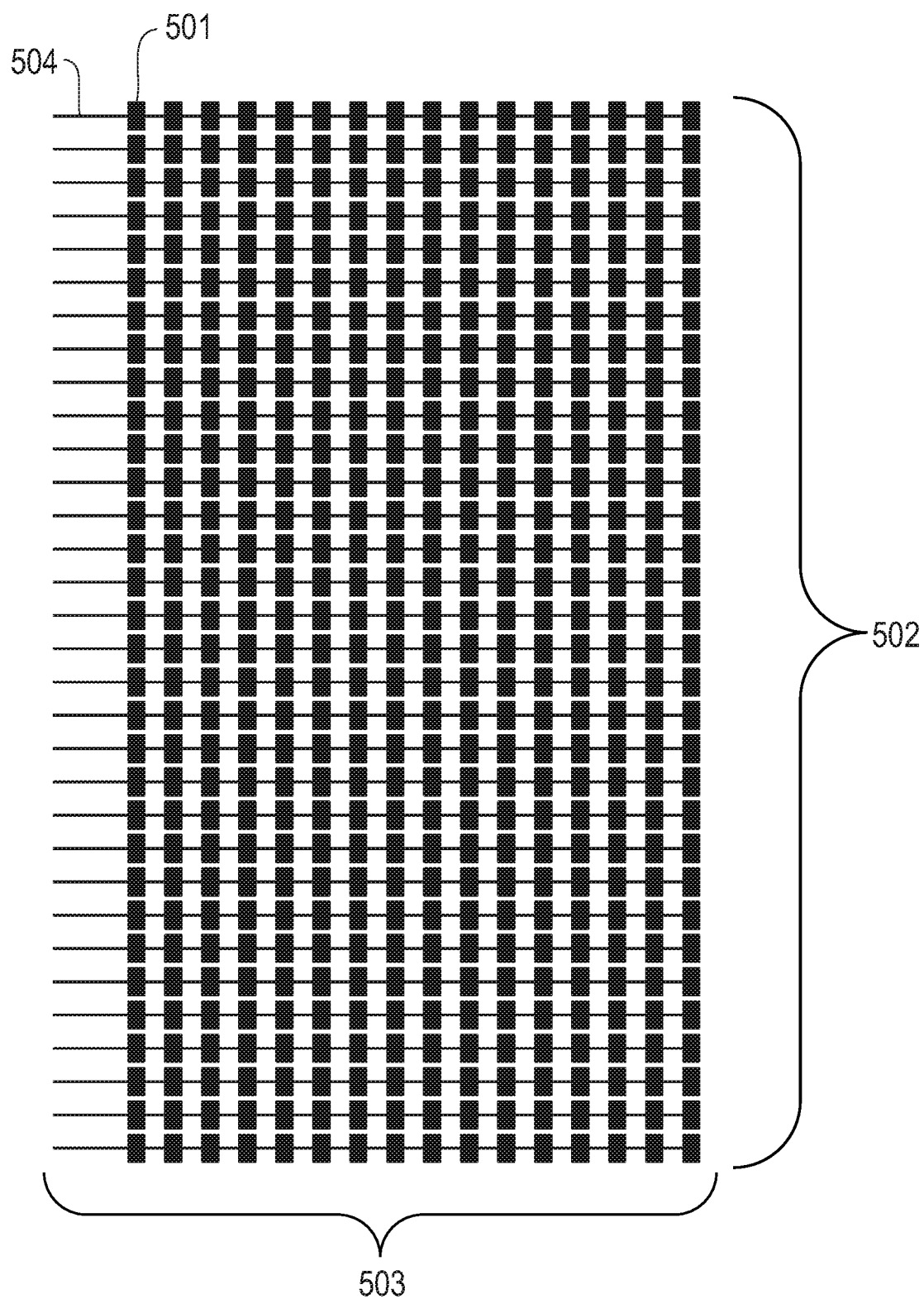
FIG. 5 illustrates local weight memory banks according to embodiments of the present disclosure.

Referring now to FIG. 5, local weight memory banks are illustrated according to embodiments of the present disclosure. In this exemplary embodiment, local weight memory banks 501 are arranged in 32 rows 502 and 16 columns 503. Each row is connected by a bus 504. In an exemplary embodiment, each bus is 16 bits, yielding a total of 512 bits across all 32 buses 504. In some embodiments, each memory bank 501 also has a depth (not pictured), providing a third dimension of the memory array. It will be appreciated that the parameters of the memory array are merely exemplary, and that various embodiments may have different memory array dimensions, number of wires, or number of clock cycles.

In various embodiments, a weight block has 32×32 elements. As pictured, in various embodiments, core (local) weight memory has 32×16 banks (holding half a weight block in parallel). Thirty-two parallel 16 bit buses 504 distribute a weight block to a core (2 weight elements per row-bus).

In an exemplary embodiment not utilizing parallel sparse weight decoding, 1 word is sent across 32 row buses every clock cycle and 2 memory bank columns are written every clock cycle. In such embodiments, 8 clock cycles are required to write half a weight block and 16 clock cycles are required to write a full weight block.

In some embodiments, row broadcast decoding is employed. In such embodiments, 1 non-zero weight is encoded per row to 1 row of compressed weight vector. The column index is included in the encoding.

Referring to FIGS. 6A-B, a first encoding format is illustrated according to embodiments of the present disclosure. In this encoding, an uncompressed weight matrix 611, 621 is converted to a compressed weight matrix 612, 622, respectively. In the compressed form, ordered pairs are provided containing a column index and a value (e.g., 0,3 denotes a 3 in the column 0).

In this format, 4 bits are allocated for a column index and 8 bits are allocated per weight. The row index is implicit. In various embodiments, the bank word address is shared across the vector.

The example of FIG. 6A has a sparsity of $7/32$, with 22% of values being non-zero. The maximum number of non-zero values per row is 1, allowing a compression ratio of 2:1.

The example of FIG. 6B has a sparsity of $13/32$, with 40% of values being non-zero. The maximum number of non-zero values per row is 2, allowing a compression ratio of 1:1.

Figure 7:
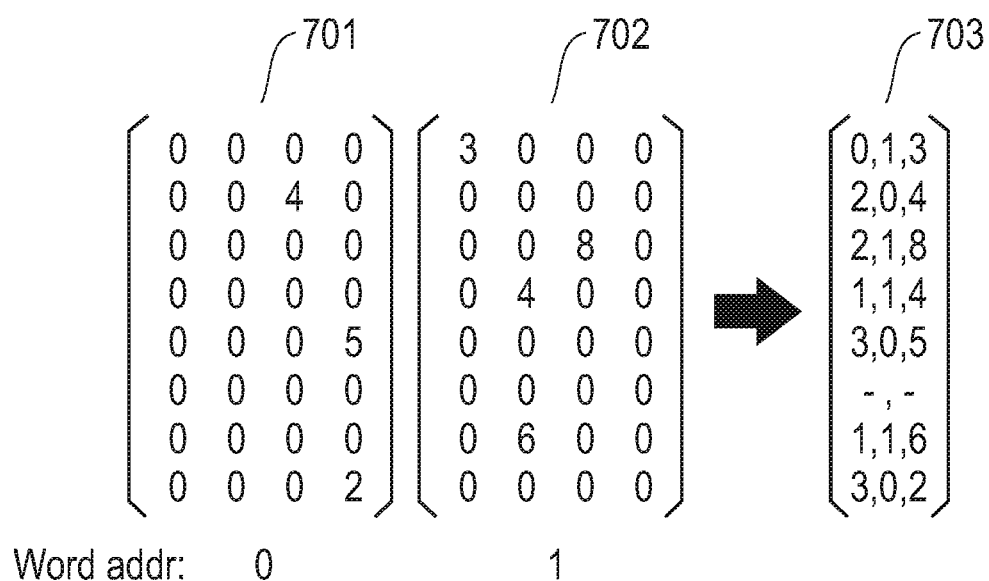
FIG. 7 illustrates a second encoding format according to embodiments of the present disclosure.

Referring to FIG. 7, a second encoding format is illustrated according to embodiments of the present disclosure. In this encoding, uncompressed weight matrices 701, 702 are converted to a compressed weight block 703, including the contents of both matrices. Weight matrices 701, 702 have different word addresses, in this case 0 and 1, respectively. In the compressed form, ordered triples are provided containing a column index, a word address, and a value (e.g., 0,1,3 denotes a 3 in column 0 of word address 1).

In this format, 4 bits are allocates for the column index, 8 bits are allocated for the weight, and 4 bits are allocated for the bank word address per sparse element. If required, additional bank word address bits are shared across vector. The row index is implicit.

The example of FIG. 7 has a sparsity of $7/64$, with 11% of values being non-zero. The maximum number of non-zero values per row is 1, yielding a compression ratio of 4:1.

Once encoded, the values are sent across rows 502, and each column bank 501 selects the values that are destined for it. This approach requires a minimum of local decode circuitry to be added at each memory bank. A single bit included with the weight vector can specify compressed or uncompressed format.

At 50% sparsity, the compressed approach has the same efficiency as full weight broadcast, with no more than 50% of any column utilized. The total number of compressed vectors corresponds to the maximum number of values in a row.

The first format above achieves a maximum compression at $1/16$th sparsity—corresponding to 8:1 compression. The second format can achieve up to 128:1 compression by using the unused 4 bits in the index as part of the bank word address.

In various embodiments, zeros are inserted for all non-assigned weights in the first load cycle. In subsequent cycles, no zero insertion is necessary. Column tags may be included to specify whether a column has been initialized (zeroed) or not.

Figure 8:
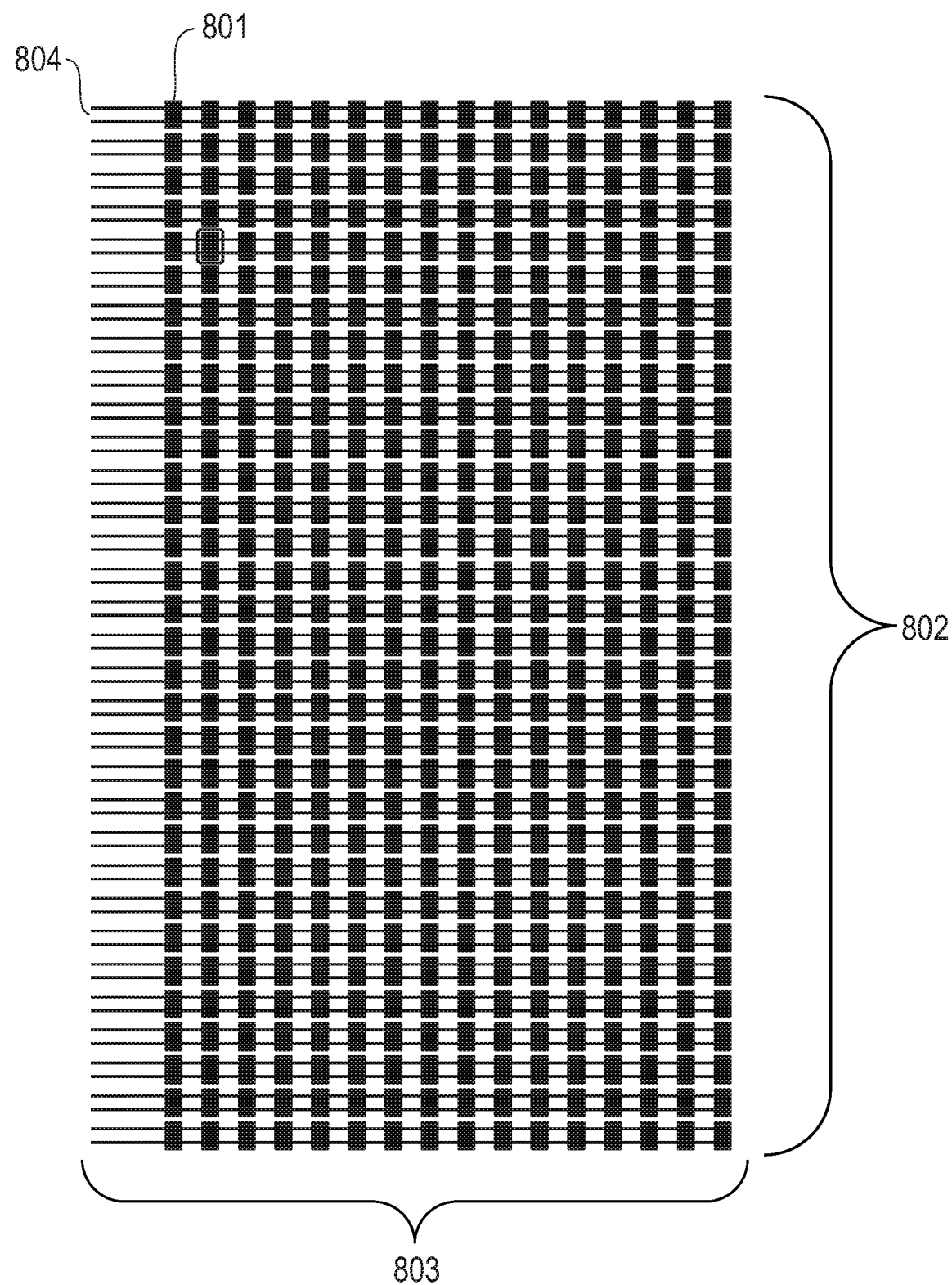
FIG. 8 illustrates local weight memory banks according to embodiments of the present disclosure.

Referring now to FIG. 8, local weight memory banks are illustrated according to embodiments of the present disclosure. In this exemplary embodiment, local weight memory banks 801 are arranged in 32 rows 802 and 16 columns 803. Each row is connected by a bus 804, which includes a pair of wires for each row. In an exemplary embodiment, each bus is 16 bits, yielding a total of 512 bits across all 32 buses 504.

Figure 9:
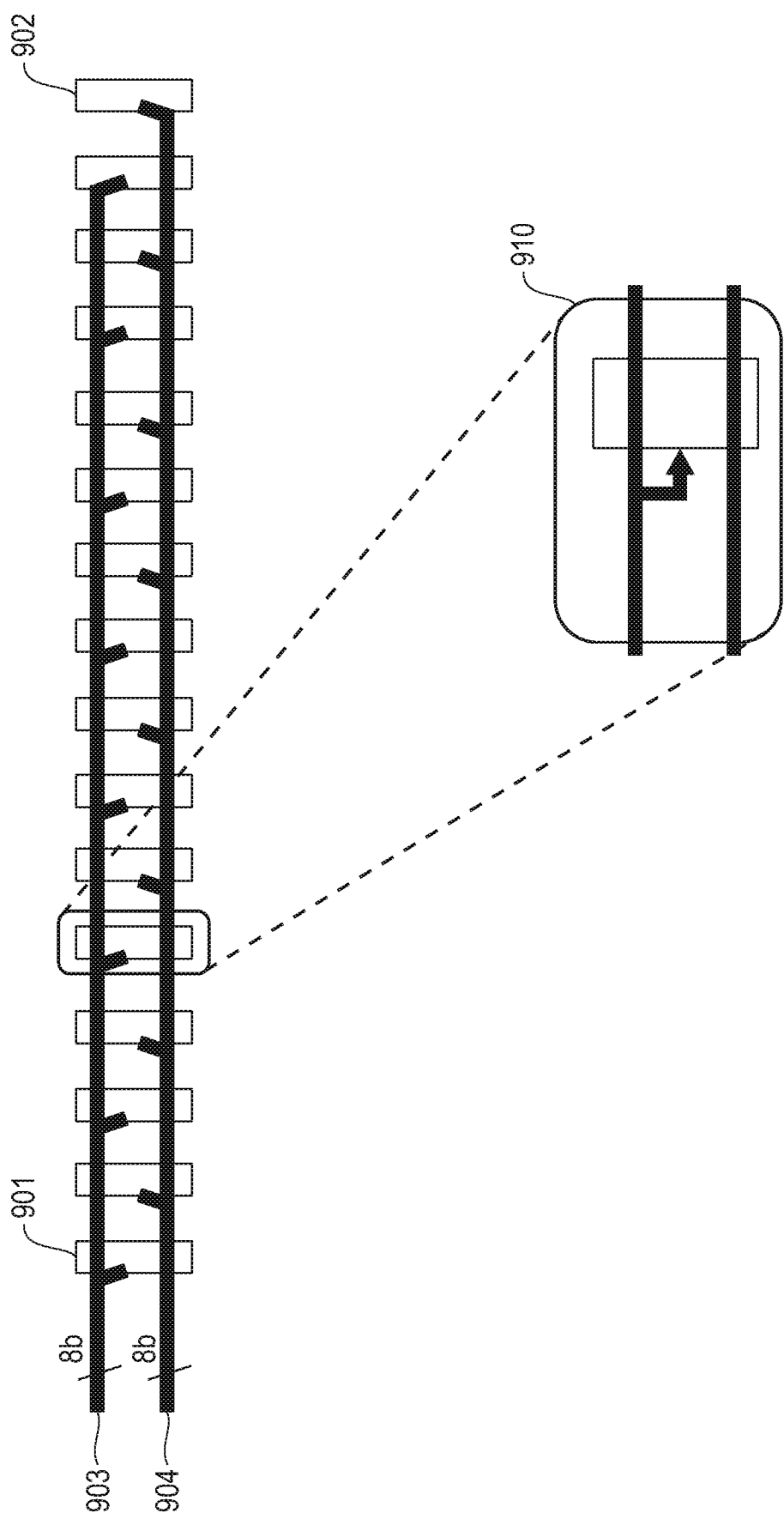
FIG. 9 is a detail view of a row of memory banks according to embodiments of the present disclosure.

Referring now to FIG. 9, a detail view is provided of a row of memory banks according to embodiments of the present disclosure. Memory banks 901 . . . 902 are connected by pair of wires 903, 904 within a row. Each wire accounts for 8 bits within a 16 bit row. In this embodiment, wire 903 provides weights to the even memory banks within the row, while wire 904 provides weights to the odd memory banks within the row. Accordingly, as shown in inset 910, no logic is required at each bank, instead a connecting is provided to one of the two wires according to the position of a given memory bank on the row.

Figure 10:
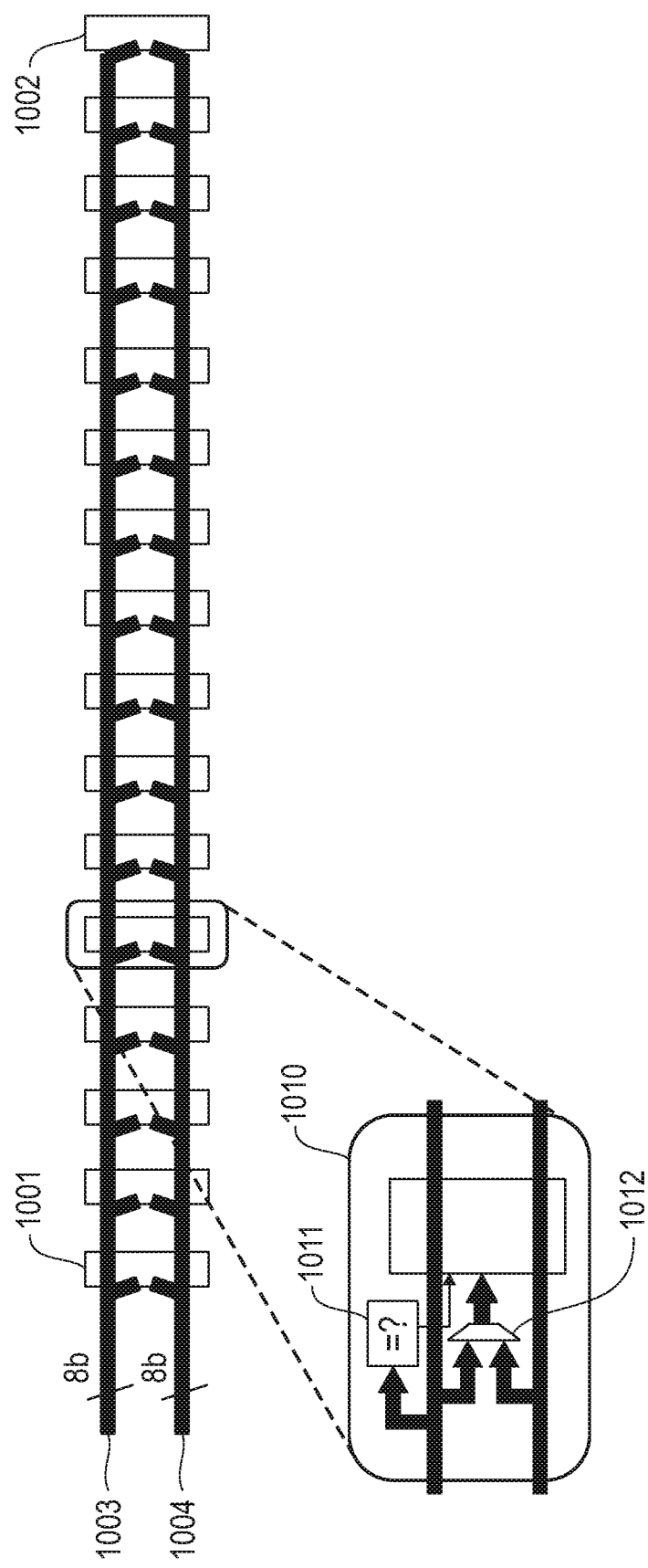
FIG. 10 is a detail view of a row of memory banks according to embodiments of the present disclosure.

Referring now to FIG. 10, a detail view is provided of a row of memory banks according to embodiments of the present disclosure. Memory banks 1001 . . . 1002 are connected by pair of wires 1003, 1004 within a row. Each wire accounts for 8 bits within a 16 bit row. As shown in inset 1010, and unlike in FIG. 9, each memory bank is connected to both wires 1003, 1004. Wire 1003 carries index information, and wire 1004 carries weights. In particular, using the first encoding format described above with regard to FIG. 6, wire 1003 carries a 4 bit column index. Using the second encoding format described above with regard to FIG. 7, wire 1003 carries a 4 bit column index and a 4 bit word address. To accommodate these addressing schemes, each memory bank includes a 4 bit comparator 1011, which compares an incoming column index to the index of the given memory bank. In various embodiments, the comparator provides a control line to a MUX (not pictured) that selects between the weight wire and zero. Each memory bank also includes an 8 bit MUX 1012, which determines whether a given memory bank receives the weight according to its column index. In particular, MUX 1012 selects between buses 1003, 1004. This configures the bank for ODD or EVEN column operation.

Figure 11:
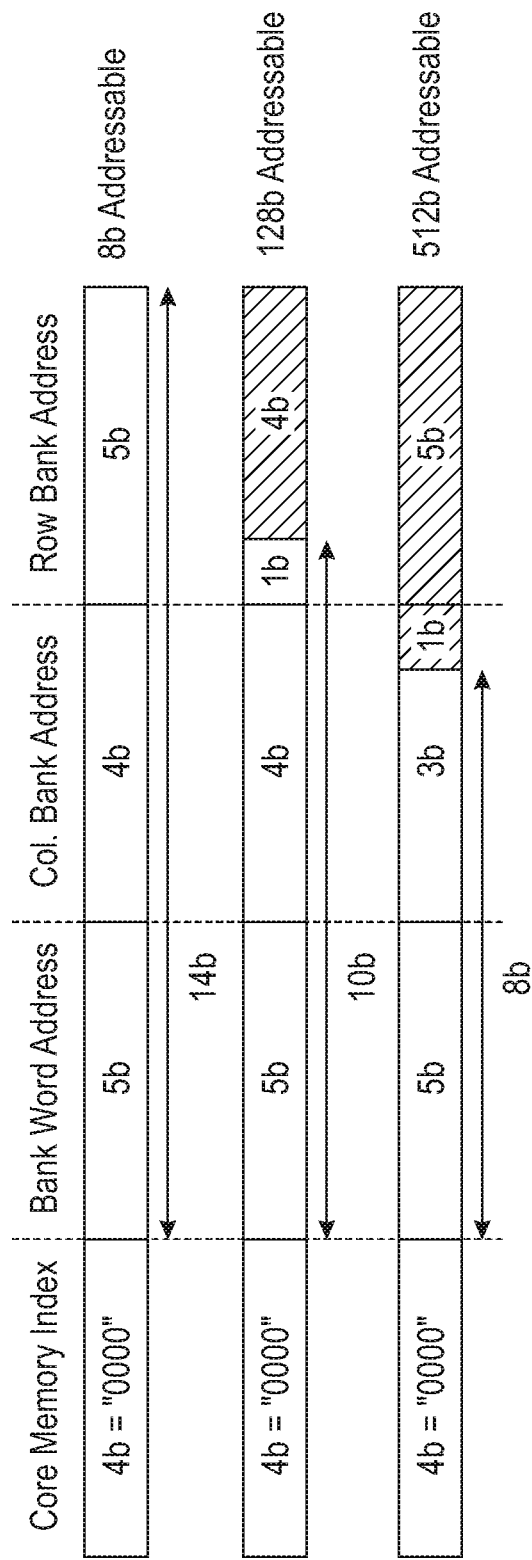
FIG. 11 illustrates a dense addressing scheme according to embodiments of the present disclosure.

Referring to FIG. 11, a dense addressing scheme is illustrated according to embodiments of the present disclosure.

Figure 12:
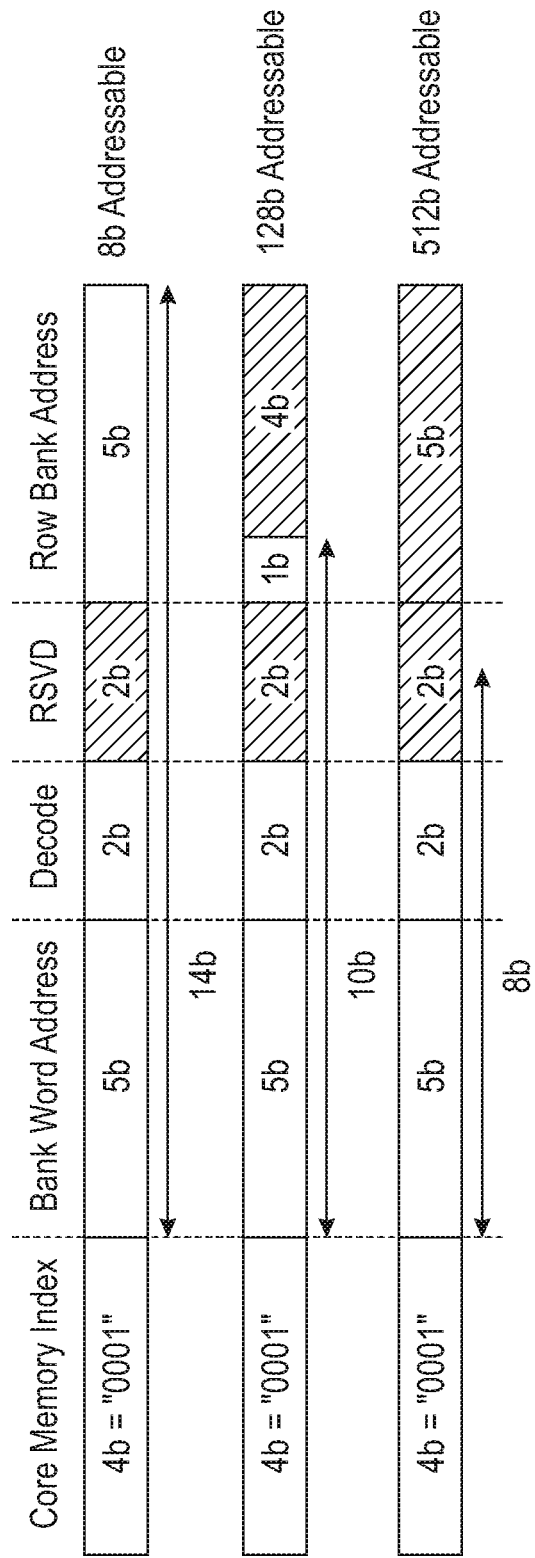
FIG. 12 illustrates a sparse addressing scheme according to embodiments of the present disclosure.

Referring to FIG. 12, a sparse addressing scheme is illustrated according to embodiments of the present disclosure.

As set out above, in various embodiments a memory array supports writing dense and sparse, and compressed and uncompressed matrices. In the exemplary sparse format depicted in FIG. 12, the 2b decode field is used for decode control. In particular, in some sparse encoding embodiments, the decode field is used for zeroing out the initial weight matrix to start decoding.

In some embodiments, as set out above, the bank word address is shared across the entire sparse vector. In such embodiments, decoding may be performed as shown in FIG. 10. In various embodiments positions in the weight matrix not having values in the compressed representation are zeroed out. In the case of a register file, a reset signal may be used. In the case of RAM, a state machine may be triggered at the end of each prior computation to zero out the memory locations.

In some embodiments, the weight matrix is decoded using a read-modify-write register as specified by the sparse vectors prior to writing the dense matrix to memory. In such embodiments, the 2 bit decode field in the core weight memory addressing figure specifies decoding control. In some embodiments, bit 0 indicates to zero all 32×16 write registers before storing decoded weights. In some embodiments, bit 1 indicates to write all 32×16 write registers to memory. These two bits can be used in conjunction, in which case: 01 indicates to zero registers, and register the vector (first compressed vector); 10 indicates to register the vector, and write registers to memory (last compressed vector); 00 indicates to register the vector (intermediate compressed vector); and 11 indicates to zero registers, register the vector, and write registers to memory (first and last compressed vector).

Figure 13:
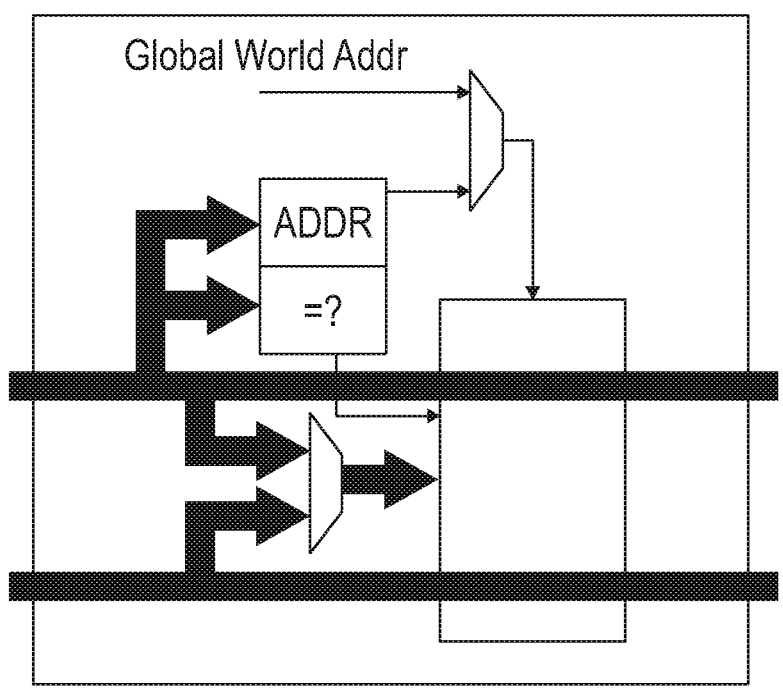
FIG. 13 is a detail view of a memory bank according to embodiments of the present disclosure.

In some embodiments, as set out above, the bank word address is individual for each element in the sparse vector. Referring to FIG. 13, an additional MUX is added to the memory bank configuration of FIG. 10. In some embodiments, the entire memory array is zeroed out. During the write process (for every bank), the 4 bit column index field specifies the column to deliver the data to and the 4 bit word addr field specifies the bank word to write to. Every bank decodes its sparse address pair independently and every bank implements a direct write process.

Figure 14:
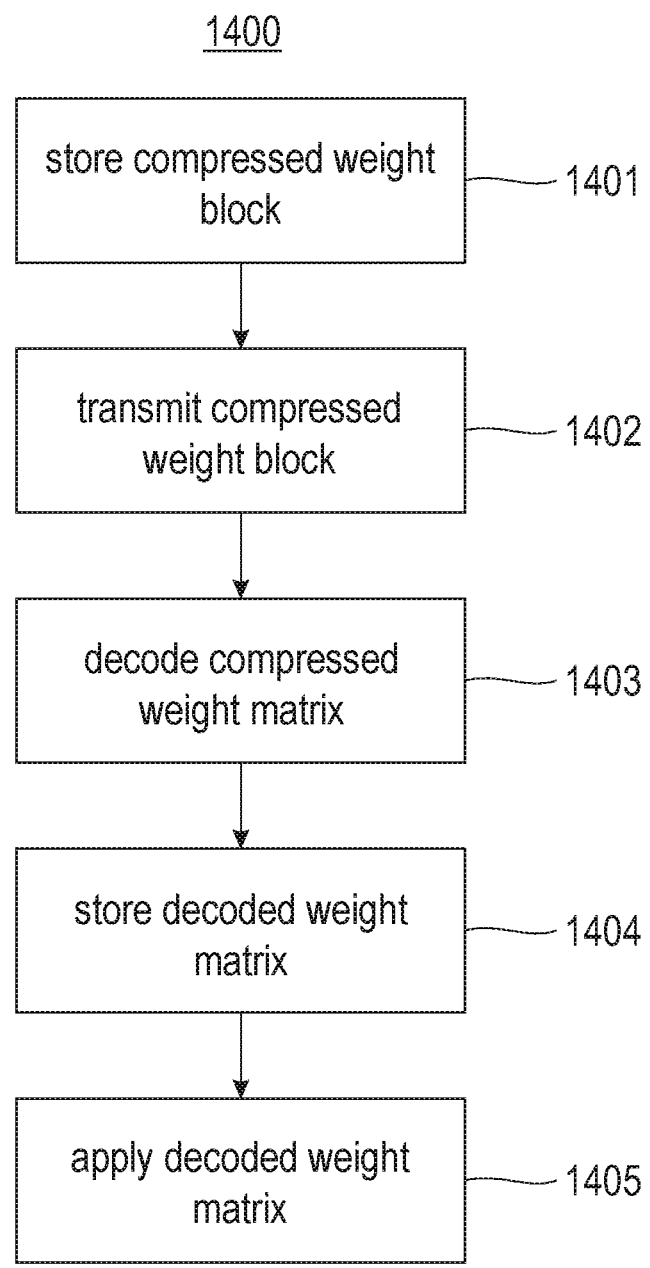
FIG. 14 illustrates a method of compressed weight distribution in networks of neural processors according to embodiments of the present disclosure.

Referring to FIG. 14, a method of weight distribution in networks of neural processors is illustrated according to embodiments of the present disclosure. At 1401, a compressed weight block comprising at least one weight matrix is stored in a global weight memory of a neural inference chip. At 1402, the compressed weight block is transmitted from the global weight memory to at least one neural core on the neural inference chip via a network. The at least one neural core comprises a local weight memory. The local weight memory comprises a plurality of memory banks. Each of the plurality of memory banks is uniquely addressable by at least one index. The network interconnects each of the plurality of memory banks. At 1403, the at least one compressed weight matrix is decoded into a decoded weight matrix. At 1404, the decoded weight matrix is stored in a local weight memory of a neural core. At 1405, the decoded weight matrix is applied to a plurality of input activations to produce a plurality of output activations.

Figure 15:
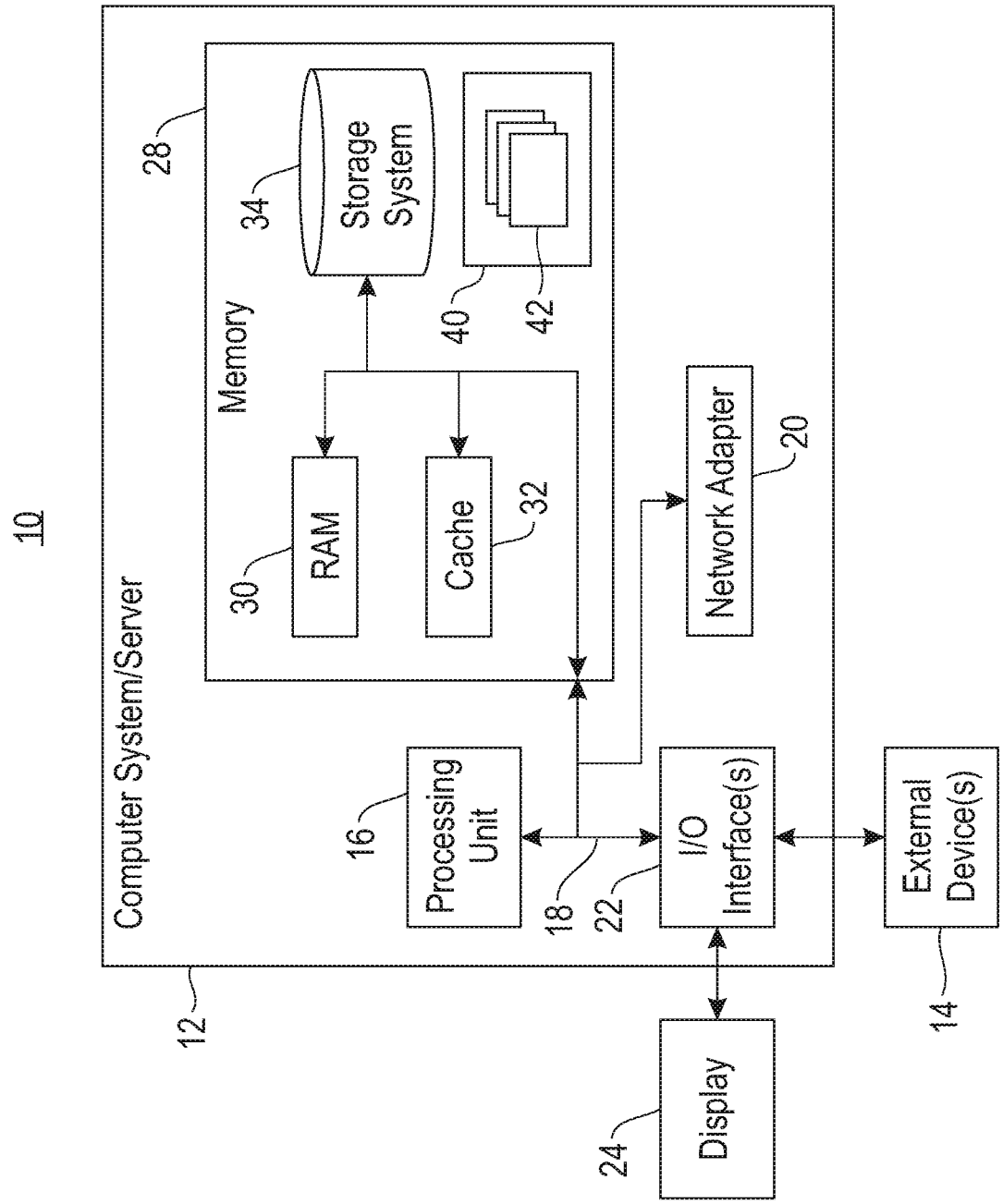
FIG. 15 depicts a computing node according to embodiments of the present disclosure.

Referring now to FIG. 15, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15 computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neural inference chip comprising:
a global weight memory;
at least one neural core, the at least one neural core comprising a local weight memory, the local weight memory comprising a plurality of memory banks,
each of the plurality of memory banks being uniquely addressable by at least one index, wherein the at least one index identifies a column of a compressed weight matrix and a first memory bank of the plurality of memory banks,
each of the plurality of memory banks comprising a comparator, a value mux, and an index mux such that the first memory bank comprises a first comparator, a first value mux, and a first index mux, wherein
the comparator of each memory bank is adapted to compare the at least one index to the index of that memory bank of the plurality of memory banks,
that comparator provides a control line to the value mux of that memory bank,
the value mux is configured to select between zero and a weight value based on the control line,
the index mux is configured to select between the weight value and an index value based on the at least one index, and
the index value is an index of the weight value in an uncompressed weight matrix;
a network-on-chip connecting the global weight memory to the at least one neural core, wherein
the neural inference chip is adapted to store in the global weight memory a compressed weight block comprising at least one compressed weight matrix,
the neural inference chip is adapted to transmit the compressed weight block from the global weight memory to the at least one neural core via the network-on-chip,
the at least one core is adapted to decode the at least one compressed weight matrix into a decoded weight matrix and store the decoded weight matrix in its local weight memory,
the at least one neural core is adapted to apply the decoded weight matrix to a plurality of input activations to produce a plurality of output activations.

2. The neural inference chip of claim 1, wherein:
the at least one compressed weight matrix comprises a plurality of column indices and associated weight values, the plurality of column indices corresponding to each position within the decoded weight matrix containing a non-zero value, the associated weight values comprising the weight value.

3. The neural inference chip of claim 1, wherein:
each of the plurality of memory banks is adapted to selectively store elements of the decoded weight matrix according to its at least one index.

4. The neural inference chip of claim 2, wherein each memory bank is adapted to selectively store elements of the decoded weight matrix by comparing the plurality of column indices to the at least one index.

5. The neural inference chip of claim 1, wherein:
the at least one compressed weight matrix comprises a plurality of rows such that the at least one compressed weight matrix comprises a first row, each of the plurality of rows comprising a column index and associated value for each position within that row of the decoded weight matrix containing a non-zero value such that the first row comprises the index value and the weight value.

6. The neural inference chip of claim 1, wherein the decoded weight matrix is sparse.

7. The neural inference chip of claim 1, wherein:
the at least one compressed weight matrix contains fewer zero values than the decoded weight matrix; and
the decoded weight matrix comprises at least one zero value.

8. The neural inference chip of claim 7, wherein decoding the at least one compressed weight matrix comprises inserting each value of the at least one compressed weight matrix into a zero-filled matrix.

9. The neural inference chip of claim 1, wherein:
the compressed weight block comprises a plurality of compressed weight matrices;
the at least one core is adapted to decode the compressed weight block into a plurality of decoded weight matrices and store the plurality of decoded weight matrices in its local weight memory; and
the at least one neural core is adapted to apply the plurality of decoded weight matrices to a plurality of input activations to produce a plurality of output activations.

10. The neural inference chip of claim 1, wherein:
the compressed weight block comprises a matrix index associated with each of the plurality of compressed weight matrices; and
each of the compressed weight matrices comprises a plurality of column indices and associated values such that the plurality of column indices comprises the index value and the associated values comprises the weight value, the plurality of column indices corresponding to each position within the associated decoded weight matrix containing a non-zero value.

11. The neural inference chip of claim 10, wherein:
each of the plurality of memory banks is adapted to selectively store elements of the decoded weight matrix according to its associated matrix index and column index.

12. The neural inference chip of claim 1, wherein:
the neural inference chip is adapted to store in the global weight memory an uncompressed weight matrix;
the neural inference chip is adapted to transmit the uncompressed weight matrix from the global weight memory to the at least one neural core via the network-on-chip;
the at least one core is adapted to store the uncompressed weight matrix in its memory; and
the at least one neural core is adapted to apply the uncompressed weight matrix to a plurality of input activations to produce a plurality of output activations.

13. The neural inference chip of claim 12, wherein:
the neural inference chip is operable to switch between a compressed and an uncompressed mode at runtime, when in compressed mode, the compressed weight block being transmitted, and when in uncompressed mode the uncompressed weight matrix being transmitted.

14. The neural inference chip of claim 1, the network-on-chip interconnecting each of the plurality of memory banks having a common row index.

15. The neural inference chip of claim 1, wherein the global weight memory is external to the at least one neural core.

16. The neural inference ship of claim 1, wherein the global weight memory is distributed among the at least one neural core.

17. A method comprising:
storing a compressed weight block comprising at least one weight matrix in a global weight memory of a neural inference chip;
transmitting the compressed weight block from the global weight memory to at least one neural core on the neural inference chip via a network-on-chip,
the at least one neural core comprising a local weight memory, the local weight memory comprising a plurality of memory banks,
each of the plurality of memory banks being uniquely addressable by at least one index, wherein the at least one index identifies a column of a compressed weight matrix and a first memory bank of the plurality of memory banks,
each of the plurality of memory banks comprising a comparator, a value mux, and an index mux such that the first memory bank comprises a first comparator, a first value mux and a first index mux, wherein
the comparator of each memory bank is adapted to compare the at least one index to an index of that memory bank of the plurality of memory banks,
that comparator provides a control line to the value mux of that memory bank,
the value mux is configured to select between zero and a weight value based on the control line,
the index mux is configured to select between the weight value and an index value based on the at least one index, and
the index value is an index of the weight value in an uncompressed weight matrix,
the network-on-chip interconnecting each of the plurality of memory banks;
decoding the at least one compressed weight matrix into a decoded weight matrix;
storing the decoded weight matrix in a local weight memory of a neural core; and
applying the decoded weight matrix to a plurality of input activations to produce a plurality of output activations.

18. The method of claim 17, wherein:
the compressed weight matrix comprises a plurality of rows, each of the plurality of rows comprising a column index and associated value for each position within that row of the decoded weight matrix containing a non-zero value.

19. The method of claim 17, wherein:
the compressed weight matrix comprises a plurality of column indices and associated values, the plurality of column indices corresponding to each position within the decoded weight matrix containing a non-zero value.

20. The method of claim 19, further comprising:
each memory bank selectively storing elements of the decoded weight matrix by comparing the plurality of column indices to a column index associated with each memory bank.

21. The method of claim 17, wherein the decoded weight matrix is sparse.

22. The method of claim 18, further comprising:
each of the plurality of memory banks selectively storing elements of the decoded weight matrix according to its associated column index.

* * * * *